(12) United States Patent
Wicks et al.

(10) Patent No.: US 10,580,151 B2
(45) Date of Patent: Mar. 3, 2020

(54) TILE-BASED LOW-RESOLUTION DEPTH STORAGE

(71) Applicant: QUALCOMM Incorporated, San Diego, CA (US)

(72) Inventors: Jonathan Wicks, Louisville, CO (US); Kevin Matlage, Erie, CO (US); Robert VanReenen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/832,118

(22) Filed: Dec. 5, 2017

(65) Prior Publication Data

US 2019/0172213 A1 Jun. 6, 2019

(51) Int. Cl.
| | | |
|---|---|---|
| *G06T 7/50* | (2017.01) | |
| *G06T 15/00* | (2011.01) | |
| *G06T 1/60* | (2006.01) | |
| *G06T 1/20* | (2006.01) | |
| *G06T 15/40* | (2011.01) | |
| *G06T 11/40* | (2006.01) | |

(52) U.S. Cl.
CPC ............ *G06T 7/50* (2017.01); *G06T 1/20* (2013.01); *G06T 1/60* (2013.01); *G06T 11/40* (2013.01); *G06T 15/005* (2013.01); *G06T 15/405* (2013.01)

(58) Field of Classification Search
CPC ...................................................... G06T 7/50
USPC ......................................................... 345/418
See application file for complete search history.

(56) References Cited

U.S. PATENT DOCUMENTS

| | | | |
|---|---|---|---|
| 8,669,987 B2 * | 3/2014 | Redshaw | ............... G06T 1/60 345/443 |
| 9,183,664 B2 | 11/2015 | Schreyer et al. | |
| 9,665,980 B2 | 5/2017 | Kim et al. | |
| 2014/0032767 A1 | 1/2014 | Nelson | |
| 2015/0363968 A1 * | 12/2015 | Yang | ............... G06T 7/13 345/420 |
| 2017/0083997 A1 | 3/2017 | Gruber et al. | |
| 2017/0244948 A1 | 8/2017 | Pang et al. | |

OTHER PUBLICATIONS

Hasselgren J., et al., "Efficient Depth Buffer Compression", Graphics Hardware 2006 Conference, Vienna, Austria, Sep. 3, 2006 (Sep. 3, 2006), 8 Pages, XP003023430, Retrieved from the Internet: URL:http://www.graphics.cs.lth.se/research/papers/depth2006/dcb.pdf [retrieved on Jan. 24, 2019].
International Search Report and Written Opinion—PCT/US2018/062881—ISA/EPO—Feb. 1, 2019 (15 pp).

* cited by examiner

*Primary Examiner* — Shivang I Patel
(74) *Attorney, Agent, or Firm* — Shumaker & Sieffert, P.A.

(57) ABSTRACT

Techniques are described for generating, with a graphics processing unit (GPU), depth values for pixels of a tile. The tile is one of a plurality of tiles of a frame. The GPU may store a first number of the depth values for the pixels in a tile memory internal to the GPU. The tile memory is configured to store image content for the tile of the frame. The GPU may write a second number of the depth values stored in the tile memory to a system memory. The second number is less than the first number.

28 Claims, 4 Drawing Sheets

TILE-BASED LOW-RESOLUTION DEPTH STORAGE

TECHNICAL FIELD

This disclosure relates to graphics processing.

BACKGROUND

Computing devices often utilize a graphics processing unit (GPU) to accelerate the rendering of graphics data for display, and a display processor to generate the signal that drives a display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. The display processor retrieves image content generated by the GPU and further processes the image content to generate the signal to drive the display to cause the display to present the image content.

SUMMARY

This disclosure describes techniques for storing depth values generated during the rendering of image content of an image frame. In tile-based graphics processing unit (GPU) architecture, the GPU determines pixel values such as color, opacity, and depth values for pixels in a tile, where a tile is a portion of the image frame. The GPU stores the pixel values in a local tile memory internal to the GPU, and after rendering the tile, stores the pixel values to system memory external to the GPU, in a process referred to as resolving the tile memory. In some examples, the GPU may write a subset (e.g., less than all) of the depth values from the tile memory to the system memory, rather than writing out all of the determined depth values. In this way, during the resolving of pixel values from the tile memory to the system memory, the GPU limits the amount of depth values that need to be written out, which may promote efficient bandwidth and memory utilization, and reduced processing.

In one example, the disclosure describes a method of generating image content, the method comprising generating, with a graphics processing unit (GPU), depth values for pixels of a tile of a frame, storing a first number of the depth values for the pixels in a tile memory internal to the GPU, wherein the tile memory is configured to store image content for the tile of the frame, and writing a second number of the depth values stored in the tile memory to a system memory, wherein the second number is less than the first number.

In one example, the disclosure describes a device for generating image content, the device comprising a system memory, and a graphics processing unit (GPU) including a tile memory. The GPU is configured to generate depth values for pixels of a tile of a frame, store a first number of the depth values for the pixels in the tile memory, wherein the tile memory is configured to store image content for the tile of the frame, and write a second number of depth values stored in the tile memory to the system memory, wherein the second number is less than the first number.

In one example, the disclosure describes a computer-readable storage medium having instructions stored thereon that when executed cause a graphics processing unit (GPU) to generate depth values for pixels of a tile of a frame, store a first number of the depth values for the pixels in a tile memory internal to the GPU, wherein the tile memory is configured to store image content for the tile of the frame, and write a second number of the depth values stored in the tile memory to a system memory, wherein the second number is less than the first number.

In one example, the disclosure describes a device for generating image content, the device comprising a system memory, and a graphics processing unit (GPU) including a tile memory. The GPU further comprises means for generating depth values for pixels of a tile of a frame, means for storing a first number of the depth values for the pixels in the tile memory, wherein the tile memory is configured to store image content for the tile of the frame, and means for writing a second number of the depth values stored in the tile memory to a system memory, wherein the second number is less than the first number.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
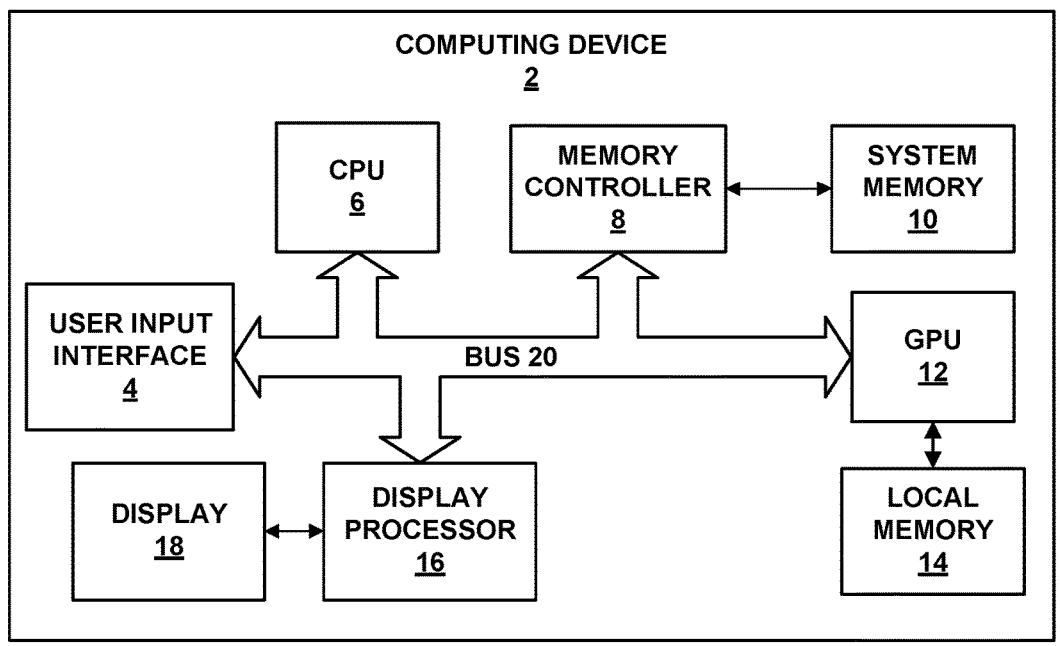
FIG. 1 is a block diagram illustrating an example computing device that may be used to implement the techniques of this disclosure.

In some graphics rendering systems, such as virtual reality (VR) and/or augmented reality (AR) systems as two non-limiting examples, depth values of pixels of an image frame may be useful for a compositor (e.g., a display processor) to composite image content of the image frame. Accordingly, a graphics processing unit (GPU) generates color, opacity (often labeled as alpha), and depth values for pixels as part of the rendering of the image frame. In some techniques, the GPU stores the entirety of the depth values in a system memory separate from the GPU, which can be bandwidth and time consuming.

This disclosure describes example techniques to reduce the number of depth values that are stored to system memory. The example techniques are described with respect to tile-based GPU architectures. In tile-based GPU architectures, a frame includes a plurality of bins (or tiles). During a binning pass, the GPU determines which draws are visible in each tile (e.g., which image content such as primitives of the frame belongs to which tile), and determines some additional primitive visibility information. During the rendering pass, the GPU renders the image content (e.g., generates color, opacity, and depth information) for the pixels of a tile, and repeats this process on a tile-by-tile basis.

For a tile, the GPU stores the color, opacity, and depth values in a tile memory of the GPU before writing out the tile memory to the system memory (e.g., before resolving the tile memory). The tile memory is internal to the GPU, and the system memory is external to the GPU. In one or more examples, rather than writing out all of the depth values of the pixels in the tile, the GPU may write out only a portion (e.g., less than all) of the depth values of the pixels in the tile. For instance, depth values for each pixel may not be necessary for post-processing operations such as Time-Warp operations in VR. Instead, only a small portion of the depth values (e.g., less than 10%, and even as low as 1%) may be needed to achieve relatively high quality post-processing. For example, the GPU may achieve the desired effect of the TimeWarp operations even with only a small portion of the depth values.

As an illustration, assume that for a tile of size N by M, the GPU generated N by M pixel values, and therefore, N by M depth values. In some examples, such as low-resolution depth buffers, or so-called low-resolution Z-buffers or LRZ buffers, the GPU may generate N/X by M/X depth values, where X is a positive value greater than one. However, only $N_D$ by $M_D$ depth values may be needed, where $N_D$ is less than N, in examples where LRZ buffers are not used, and N/X, in examples where LRZ buffers are used, and $M_D$ is less than M, in examples where LRZ buffers are not used, and M/X, in examples where LRZ buffers are used.

In example techniques described in this disclosure, the GPU may be configured to write out $N_D$ by $M_D$ depth values, rather than N by M, or N/X by M/X depth values, to the system memory thereby saving bandwidth and time, and with reduced processing. For example, the tile memory may store N by M and/or N/X by M/X depth values, but as part of writing out the depth values from tile memory to system memory, the GPU may only write out $N_D$ by $M_D$ depth values. The GPU may perform such operations after the rendering of image content for a tile, and before rendering image content for a next tile. In other words, the GPU may perform such operations on a tile-by-tile basis after the rendering of image content for a tile.

There may be various ways in which the GPU determines which depth values to write to system memory. As one example, the GPU may write out every $10^{th}$ depth value of the N-depth values, and write out every $10^{th}$ depth value of the M-depth values (e.g., write out every $100^{th}$ depth value) for a reduction of 100× of the depth values that are written. If the GPU wrote out every $8^{th}$ depth value of the N-depth values, and every $5^{th}$ depth value of the M-depth values, there may be a reduction of 40× in the depth values that are written. As another example, a developer may define which depth values to write out.

There may be various ways in which the GPU writes out the $N_D$ by $M_D$ depth values. As one example, the GPU may execute a shader (e.g., an example of a fragment shader or a resolve shader) that retrieves the N by M depth values as a texture map from the tile memory. The shader is configured to discard (N−$N_D$) by (M−$M_D$) depth values, and write out the $N_D$ by $M_D$ depth values. However, in this example, the shader needs to execute N by M times for each of the N by M pixels. For instance, in this example, the texture map may be defined as having size N by M. Therefore, the shader executes on each texel in the N by M sized texture map. A texel is a generic term to refer to a sample (e.g., texture element) in the N by M texture map. In this example, a texel is a depth sample.

For example, a depth sample refers to a sample in the N by M texture map. Each depth sample is associated with a depth value that indicates the depth of that depth sample. Also, each depth sample is associated with a pixel in a tile.

In some examples, a shader processor may execute the shader that is configured to operate only on the depth samples that need to be retained. For example, the shader may define a texture map of size 1 by 1 for each of the depth samples to be retained, at a particular location in the tile memory so that the GPU writes out $N_D$ by $M_D$ depth values. The shader may execute for that texel (e.g., depth sample) and write out that texel (e.g., depth sample) as the depth value. In this example, the shader may execute only $N_D$ by $M_D$ number of times.

As some additional examples, the shader may define a plurality of texture maps having different sizes (e.g., A by B, where A by B is less than N by M). The shader may execute to retrieve the A by B values. The shader may average the values, determine the value with the highest value, or perform filtering in some other fashion to determine a final depth value for writing to system memory.

In some examples, to execute this shader, the developer may include a new drawcall after all other drawcalls that were used to render the image content of a tile. This drawcall may utilize the shader that includes commands to fetch and read the depth values from the tile memory, and write out the determined depth values. The developer may also discard commands that are used to write out the full depth information. In some examples, rather than the developer including such a drawcall, a compiler or graphics driver may include the drawcall in the source code (e.g., via the graphics driver) of the application, or in the object code (e.g., via the compiler).

The commands to fetch and read the depth values may be commands presently available in existing APIs. Therefore, modifications to existing APIs may not be needed to perform the example techniques described in this disclosure. In other words, the example techniques may be performed using commands in existing APIs to reduce the amount of depth values that need to be stored.

FIG. 1 is a block diagram illustrating an example computing device 2 that may be used to implement techniques of this disclosure. Computing device 2 may comprise a camera, a computer (e.g., personal computer, a desktop computer, a laptop computer, a tablet computer and/or a computer workstation), a video game platform or console, a mobile device such as wireless communication device (e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a set-top box, a broadcast receiver, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display processor 16, a display 18, pose monitor circuit 19, and bus 20. User input interface 4, CPU 6, memory controller 8, GPU 12 and display processor 16 may communicate with each other using bus 20. Bus 20 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a media editing application a video game application, a graphical user interface application, a teleconferencing application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6, forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated circuits or discrete logic circuits.

GPU 12 may be directly coupled to GPU local memory 14. Thus, GPU 12 may read data from and write data to GPU local memory 14 without necessarily using bus 20. In other words, GPU 12 may process data locally using local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display processor 16 may retrieve the data from the frame buffer and configure display 18 to display the image represented by the rendered image data. In some examples, display processor 16 may include a digital-to-analog converter (DAC) that is configured to convert the digital values retrieved from the frame buffer into an analog signal consumable by display 18. In other examples, display processor 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit.

Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

As described above, GPU 12 generates image content for eventual display. Examples of the image content includes pixel values of pixels of an image frame. The pixel values include color values, depth values, and/or opacity values. Color values may include a red-component value, a green-component value, and a blue-component value (e.g., RGB values).

Depth values indicate the relative depth of the pixels in the image frame. For example, each pixel may be assigned an (x, y, z) coordinate in the image frame. The x, y-coordinate values may indicate location of the pixel in the image frame, and the z-coordinate value may indicate the depth of the pixel in the image frame. Opacity values indicate how opaque the pixel is, and if and by how much a pixel occludes another pixel. For example, a pixel that is fully opaque and has a smaller z-coordinate value than another pixel may completely occlude the other pixel. However, a pixel that is partially opaque and has a smaller z-coordinate value than another pixel may not completely occlude the other pixel. In this example, the color values of the two pixels may be blended together to generate the final pixel value for display, where the blending is based on the respective opacity values.

The final image frame that is displayed on display 18 is a 2D image. However, having depth values for the pixels may be useful for various applications. As one example, depth values may be useful for virtual reality (VR) or augmented reality (AR) applications.

In some VR applications, such as gaming applications, the user attaches computing device 2 to his head (e.g., computing device 2 is a head mounted display (HMD) device), and views image content on display 18. The user can "move" through the image content, since computing device 2 determines location and viewing angle of the user relative to the image content that is being displayed. As an example, display 18 may present image content of a hallway, with rooms along the hallway and objects in the hallway. The user perceives as if he or she is walking through the hallway and entering the rooms, or viewing around (e.g., behind, left, or right) of objects in the hallway. The depth values for pixels in such examples may be useful for determining what portions need to be rendered so that the user does not experience disocclusion (e.g., blank space).

In some AR applications, a virtual object is presented along with real-world objects. The user may interact with the virtual object or otherwise manipulate the virtual object in the real-world space. Having the depth values for pixels in such examples may be useful as well for determining image content that needs to be rendered and/or displayed.

Depth values may be useful in applications that use 3D space. VR and AR applications are two examples of applications that use 3D space, and the techniques are not limited to VR and AR application. More generally, the example techniques described in this disclosure may be useful for applications that use depth values, whether for use in 3D space or not. For ease of description, the examples are described with respect to VR and AR applications, but the techniques are not so limited.

In VR applications, there is an eye-buffer round of processing and a warping round of processing. In the eye-buffer round, GPU 12 renders image content based on where the user is viewing image content (e.g., based on head and/or eye position) as determined by a position circuit (not illustrated). In addition, GPU 12 may render image content beyond image content currently viewable by the user in the event that the user makes any sudden changes to head or eye position so that there is image content available for the user to view.

In the warping round, GPU 12 may utilize the image content rendered during the eye-buffer round and warp the image content based on the current head position in the event that the user moved his or her head after the eye-buffer round. In this case, if there is head position movement, GPU 12 may use image content rendered during the eye-buffer round for warping so that image content is now available. For example, in four degrees of freedom (4DOF) asynchronous TimeWarp (e.g., warping), GPU 12 may use the depth values to improve warping based on translation head movement (e.g., head movement in the time after image information is received for the eye-buffer round, and image content is rendered for display).

As part of the eye-buffer round, GPU 12 may write to the eye-buffer of system memory 10 the pixel values of the rendered pixels. For example, GPU 12 may write the color, opacity, and depth values. However, storing of the depth values may be expensive in terms of power and performance. For example, GPU 12 may typically utilize approximately 30% to 40% of the eye-buffer frame time (e.g., time needed to write pixel values during the eye-buffer round) in mobile VR applications for storing depth values.

In some examples, prior to storing the depth values, GPU 12 may perform compression and/or downsampling (e.g., multisample anti-aliasing (MSAA) downsampling). Compression and/or downsampling may be one example way in which GPU 12 may reduce the amount of depth values that are stored. In some examples, in addition to or instead of compression and/or downsampling, GPU 12 may perform example techniques to further reduce the amount of depth values that are stored. However, performing techniques to further reduce the amount of depth values that are stored are not necessary in every example. In some examples, GPU 12 may not be configured to perform compression and/or downsampling.

Moreover, the reading of the depth values may cause the warping operation to be delayed. For instance, because the depth values were written during the eye-buffer round, GPU 12 may utilize time and power reading back the depth values during the warping round. Furthermore, memory space in system memory 10 may not be efficiently utilized because system memory 10 may store all of the depth values.

In some examples, not all depth values are used for rendering image content with limited effect on image quality (e.g., image quality may be at the desired level even if not all depth values are used). In some cases, as little as 1% of the depth values may be used.

This disclosure describes a flexible way in which GPU 12 may store only a limited number of depth values to reduce the amount of information that GPU 12 needs to write to system memory 10, and then subsequently needs to read from system memory 10. The example techniques may be flexible such that a developer may selectively determine how many depth values should be written. This way, for applications where a relatively high amount of depth values are used, or for applications where a relatively low amount of depth values are used, the developer may ensure that the right number of depth values are written using the example techniques.

Accordingly, in graphics processing technologies where depth values are used as part of rendering, there may be issues with storing the depth values because of time and processing used. This disclosure describes example techniques which may address the depth value storage issues for graphics processing. In this way, the operation of GPU 12 may be enhanced as less time and performance is required of GPU 12 to perform its operations. In one or more examples, to limit the amount of depth values that need storage, GPU 12 may leverage part of the graphics processing pipeline operations so that the example techniques may be performed with off-the-shelf examples of GPU 12. For instance, the example techniques may be performed by a wide variety of different types of GPU 12 without needing modification to the underlying structure of the GPU 12.

As described in more detail, GPU 12 may store a limited number of depth values as operations between rendering of tiles in examples where GPU 12 is configured in accordance with a tile-based architecture. In a tile-based architecture, an image frame is divided into a plurality of tiles (e.g., by CPU 6 or GPU 12). GPU 12 then operates on a tile-by-tile basis, performing two passes on each tile to determine the image content for that tile.

A first pass is referred to as a binning pass, in which GPU 12 determines which draws belong to which bin (also called a tile) and which draws are visible (e.g., generates visibility information). Bins or tiles are examples of portions of an image frame. In a second pass, referred to as a rendering pass, GPU 12 renders each portion (e.g., tile or bin) sequentially based on the determination of which draws belong to which tile and the visibility of the draws.

Such dual pass graphics processing architectures (sometimes referred to as streamout-based binning architectures) may be useful for various reasons. As one example, additional processing stages such as domain shaders, tessellation, and/or geometry shaders can be added to GPU 12, and there is efficient overlap of binning and rendering due to time-separated geometry and rasterization processing (e.g., GPU 12 may render one image surface while performing binning on the next surface).

As part of the rendering pass, GPU 12 writes the pixel values for primitives of a tile memory that is local to GPU 12 (e.g., tile memory is part of local memory 14). GPU 12 may then write the pixel values of a tile to system memory 10, in a process referred to as resolving the tile memory. The tile memory may be a storage space that temporarily stores pixel values of a tile as GPU 12 determines all the pixel values of that tile. Once GPU 12 determines the pixel values for all pixels of the tile, GPU 12 resolves the tile memory by writing the pixel values to system memory 10. GPU 12 then repeats these operations on a tile-by-tile basis.

For example, for a first tile, GPU 12 may write the pixel values for pixels of that tile to the tile memory. GPU 12 may then write the pixel values from the tile memory to system memory 10. Then, GPU 12 may write the pixel values for pixels of a second tile to the tile memory, and then write the pixel values from the tile memory to system memory 10, and so forth.

In one or more examples, rather than waiting for commands that fully resolve the depth samples from the tile memory (e.g., depth values associated with each of the pixels), GPU 12 may write depth values for a limited number of depth samples from the tile memory. For example, GPU 12 may store a first number of the depth values for the pixels in the tile memory, but GPU 12 may write a second number of the depth values from the tile memory to system memory 10. In this example, the second number is less than the first number.

As an example, assume there are 1000 pixels in a tile. GPU 12 may store depth values for the 1000 pixels in the tile to the tile memory. In this example, the first number is a 1000. GPU 12 may write to system memory 10 depth values for 10 pixels. In this example, the second number is 10. GPU 12 may not need to store depth values for all 1000 pixels in the tile memory, and there may be more or fewer than 10 depth values that GPU 12 writes to system memory 10.

As described in more detail, GPU 12 may execute a drawcall, referred to as a depth values drawcall to help avoid confusion with other drawcalls. In response to executing the depth values drawcall, GPU 12 may write depth values for a limited number of pixels (e.g., less than all pixels) of a tile from tile memory to system memory 10. In other words, GPU 12 may write a second number of the depth values stored in the tile memory to system memory 10 responsive to executing the depth values drawcall. In this example, the tile memory may store a first number of the depth values, and the second number is less than the first number.

As one example, the developer may include a depth values drawcall after a series of drawcalls, where the series of drawcalls generate image content for a current tile being processed. This depth values drawcall after the series of drawcalls may be a last drawcall after all other drawcalls that generate image content for the tile. However, techniques are not limited to the depth values drawcall being the last drawcall after all other drawcalls that generate image content for the tile. Also use of a depth values drawcall to cause GPU 12 to output depth values for a limited number of pixels or depth samples of a tile from tile memory to system memory 10 is one example way in which GPU 12 limits the amount of depth values that are written to system memory 10. Other possible ways to limit the amount of depth values written from tile memory to system memory 10 are possible.

A drawcall is an instruction included in the application executing on CPU 6 that generates the image content that GPU 12 renders. A drawcall instruction includes all information that instructs GPU 12 about textures, states, shader programs to execute, rendering objects, buffers, etc. In some examples, the application executing on CPU 6 includes a set of drawcalls for each object that cause GPU 12 to render that object. This way, by executing a plurality of the sets of drawcalls, GPU 12 may render all of the objects of a tile, and generate pixel values for each of the pixels in the tile.

A depth values drawcall may be different from other drawcalls in that, in one or more examples, the depth values drawcall is not used to render image content. Rather the depth values drawcall identifies a shader program that when GPU 12 executes the shader program, GPU 12 writes depth values for selected pixels (e.g., selected depth samples) of the tile to system memory 10. For ease of reference, the shader program that causes GPU 12 to write depth values for selected pixels of the tile is referred to as a tile-depth resolve shader, and may be an example of a fragment shader since it operates on pixels. In this way, GPU 12 may leverage use of a shader program (e.g., tile-depth resolve shader) for purposes of selectively writing limited depth values (e.g., depth values for limited depth samples) to system memory 10, without any changes to the underlying structure of GPU 12. Example operations of the tile-depth resolve shader are described in more detail below.

In general, in FIG. 1, GPU 12 may generate depth values for pixels of a tile, where the tile is one of a plurality of tiles of a frame. GPU 12 may store the depth values for the pixel in a tile memory of local memory 14 which is configured to store image content for the tile of the frame. GPU 12 may execute a shader (e.g., tile-depth resolve shader) to write out a subset of depth values (e.g., actual depth values for a limited number of pixels) stored in the tile memory to system memory 10. In some examples, compression of the depth values is possible, but even such compression may be done on a subset of depth values. As described above, GPU 12 may execute the tile-depth resolve shader in response to a drawcall (e.g., depth values drawcall). The depth values drawcall may be included after drawcalls used to render the image content for the tile.

GPU 12 may repeat these operations on a tile-by-tile basis. For example, GPU 12 may store, in the tile memory, rendered image content for each of the plurality of tiles in sequential rendering passes of each of the tile. GPU 12 may also execute the shader (e.g., tile-depth resolve shader) in each sequential rendering pass of each of the tiles to sequentially write out respective subsets of the depth values stored in the tile memory to system memory 10.

As described above, GPU 12 may store a first number of the depth values for the pixels in the tile memory, and write a second, lower number of the depth values stored in the tile memory to system memory 10. The tile memory, in addition to depth values, may also store color or opacity values for the pixels of the tile. For example, the tile memory may store a third number of the color or opacity values for the pixels of the tile. The third number and the first number may be the same, but not necessarily in all examples. The third number is greater than the second number. GPU 12 may write the third number of the color or opacity values for the pixels of the tile to system memory 10. In this way, in some examples, GPU 12 may store depth values for a subset for the pixels, but may store the color or opacity values for all or more than the subset of pixels in system memory 10. In this disclosure, color or opacity values includes just color values, just opacity value, or both color and opacity values.

Figure 2:
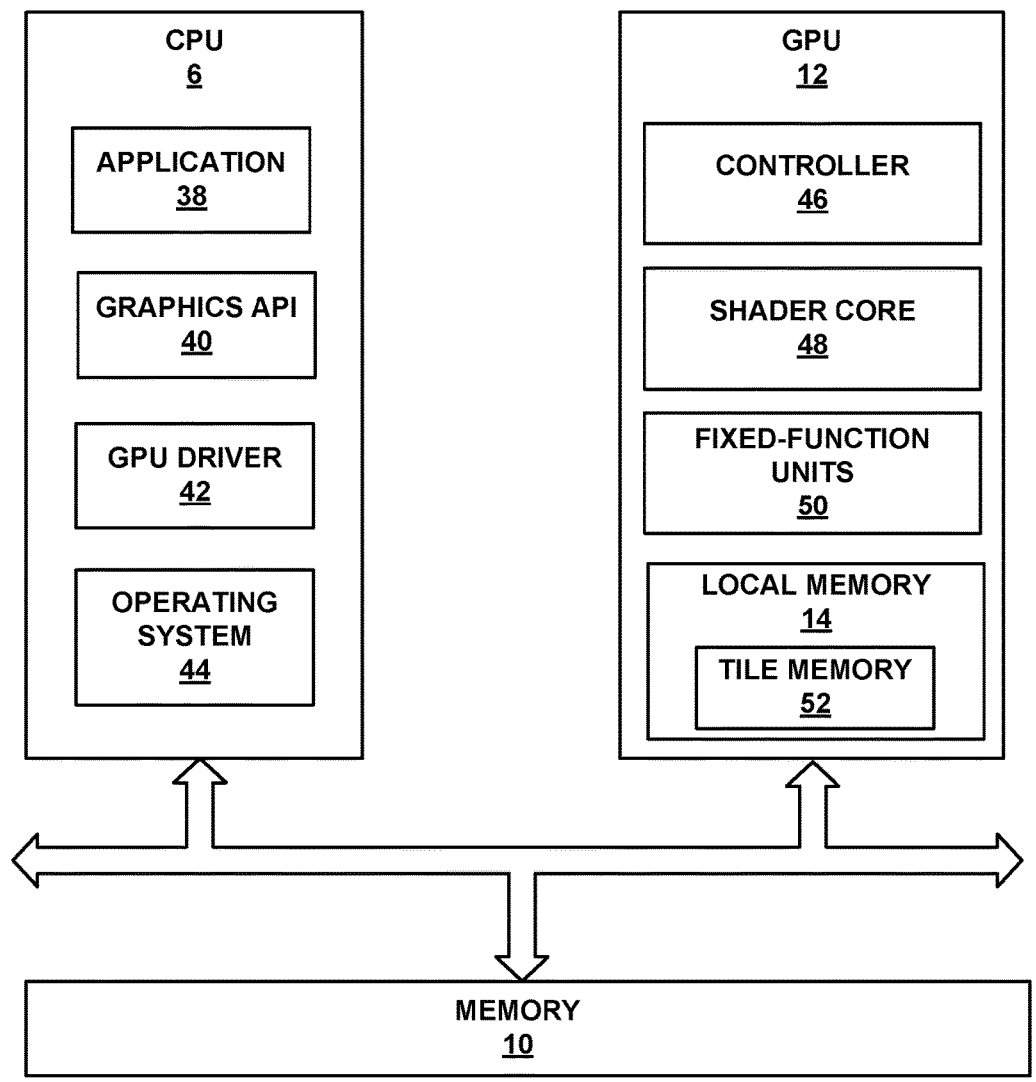
FIG. 2 is a block diagram illustrating a CPU, a GPU and a memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6, e.g., forming part of a system on a chip (SoC).

As illustrated in FIG. 2, CPU 6 is configured to execute application 38, a graphics application programming interface (API) 40, a GPU driver 42, and an operating system 44. In the example of FIG. 2, GPU 12 includes a controller 46, shader core 48, and one or more fixed-function units 50. For ease, local memory 14 is also illustrated as being a part of GPU 12 but may be external as well. Also, as illustrated, local memory 14 includes tile memory 52.

Software application 38 may include at least some of one or more instructions that cause graphic content to be displayed or one or more instructions that cause a non-graphics task (e.g., a general-purpose computing task) to be performed on GPU 12. Software application 38 may issue instructions to graphics API 40. Graphics API 40 may be a runtime service that translates the instructions received from software application 38 into a format that is consumable by GPU driver 42. In some examples, graphics API 40 and GPU driver 42 may be part of the same software service.

GPU driver 42 receives the instructions from software application 38, via graphics API 40, and controls the operation of GPU 12 to service the instructions. For example, GPU driver 42 may formulate one or more command streams, place the command streams into memory 10, and instruct GPU 12 to execute command streams. GPU driver 42 may place the command streams into memory 10 and communicate with GPU 12 via operating system 44 (e.g., via one or more system calls).

Controller 46 is configured to retrieve the commands stored in the command streams, and dispatch the commands for execution on shader core 48 and one or more fixed-function units 50. Controller 46 may dispatch commands from a command stream for execution on one or more fixed-function units 50 or a subset of shader core 48 and one or more fixed-function units 50. Controller 46 may be hardware of GPU 12, may be software or firmware executing on GPU 12, or a combination of both.

Shader core 48 includes programmable circuitry (e.g., processing cores on which software executes). One or more fixed-function units 50 include fixed function circuitry configured to perform limited operations with minimal functional flexibility. Shader core 48 and one or more fixed-function units 50 together form a graphics pipeline configured to perform graphics processing.

Shader core 48 may be configured to execute one or more shader programs that are downloaded onto GPU 12 from CPU 6. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 48 may include a plurality of processing units that are configured to operate in parallel (e.g., a SIMD pipeline). Shader core 48 may have a program memory that stores shader program instructions and an execution state register (e.g., a program counter register) that indicates the current instruction in the program memory being executed or the next instruction to be fetched. Examples of shader programs that execute on shader core 48 include, for example, vertex shaders, pixel shaders (also referred to as fragment shaders), geometry shaders, hull shaders, domain shaders, compute shaders, and/or unified shaders. As described in more detail, shader core 48 may also execute a tile-depth resolve shader to write a subset of the depth values from tile memory 52 to system memory 10.

Fixed-function units 50 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 50 may include, for example, processing units that perform raster operations (e.g., depth testing, scissors testing, alpha blending, etc.).

GPU driver 42 of CPU 6 may be configured to write the command streams to memory 10, and controller 46 of GPU 12 may be configured to read the one or more commands of command streams from memory 10. In some examples, one or both of command streams may be stored as a ring buffer in memory 10. A ring buffer may be a buffer with a circular addressing scheme where CPU 6 and GPU 12 maintain synchronized state variables associated with the writing of data to and reading of data from the ring buffer. For example, if the first command stream is a ring buffer, each of CPU 6 and GPU 12 may store a write pointer indicating the next address to be written to in the ring buffer, and a read pointer indicating the next address to be read from in the ring buffer.

When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 42 and an example GPU controller 46 will now be described with respect to FIG. 2. GPU driver 42 receives one or more instructions from software application 38 that specify graphics operations and/or general-purpose computing operations to be performed by GPU 12. GPU driver 42 places the output command stream into memory 10, which is accessible by GPU controller 46. GPU driver 42 notifies GPU controller 46 that the command stream corresponding to software application 38 is available for processing. For example, GPU driver 42 may write to a GPU register (e.g., a GPU hardware register polled by GPU 12 and/or a GPU memory-mapped register polled by GPU 12) one or more values indicating that the command stream is ready for execution.

Upon notification that the command stream is ready for execution, controller 46 of GPU 12 may determine if resources are currently available on GPU 12 to begin executing the command stream. If resources are available, controller 46 begins to dispatch the commands in the command stream.

As part of graphics processing, CPU 6 may offload certain graphics processing tasks to GPU 12. For instance, application 38 may generate attribute data for attributes of a plurality of vertices of primitives that interconnect to form a graphical object. Application 38 may store the attribute data in a vertex buffer in memory 10. GPU driver 42 may instruct controller 46 to retrieve the attribute data for the attributes of the vertices for processing to generate graphics data for display.

As described above, GPU 12 may be configured to generate image content in two passes: binning pass and rendering pass. Although the example techniques are described with respect to two passes, the example techniques are not so limited.

In the binning pass, GPU driver 42 and/or controller 46 may define a size of a tile (also referred to as a bin), where each tile is of size N×M (e.g., N×M number of pixels). The tile need not all be the same size, and N and M may be equal in some examples.

Controller 46 may then cause shader core 48 and fixed-function units 50 to perform respective operations to determine which primitives belong in which tile and which vertices are visible. In the rendering pass, controller 46 may cause shader core 48 and fixed-function units 50 to perform respective operations on a per-tile basis to render the image content on a tile-by-tile basis. The output of the rendering pass may be pixel values for pixels of a tile, including color, opacity, and depth values for the pixels of the tiles. Tile memory 52 may store the pixel values as the image content for a tile, and GPU 12 stores the resulting image content from tile memory 52 to system memory 10 for retrieval and display. GPU 12 may then use tile memory 52 to store pixel values for the next tile in the tile-by-tile processing.

As described above, GPU 12 may be configured to selectively output a subset of depth values (e.g., depth values for a subset of depth samples or pixels) stored in tile memory 52 since not all depth values may be necessary for generating the final image content that is displayed. As an example, tile memory 52 may store a first number of depth values for pixels, and GPU 12 may be configured to write a second number of the depth values stored in tile memory 52 to system memory 10. In some examples, GPU 12 may write to system memory 10 the color or opacity values for the pixels stored in tile memory 52, but only write a subset of depth values to system memory 10.

For example, GPU 12 may render image content as part of the eye-buffer round, and GPU 12 may then use the image content, rendered during the eye-buffer round, for warping as part of the warping round. The depth values determined as part of the eye-buffer round may be useful for performing the warping as part of the warping round. GPU 12 may use the depth values, as part of the warping round, to determine which pixels to render and how to render the pixels.

One example way in which GPU 12 may write a subset of depth values is the use of a tile-depth resolve shader that executes on shader core 48. The tile-depth resolve shader may be configured to selectively output depth values stored in tile memory 52. For example, tile-depth resolve shader may read in the depth values of tile memory 52 as a "texture map." A texture map is generally image content (e.g., a bitmap) that is mapped onto a mesh model to form a 3D object. In some examples, although the depth values stored in tile memory 52 are being read as a texture map, the depth values are not actual image content that is mapped onto a mesh model to form a 3D object. Rather, the depth values are being treated as a texture map to allow GPU 12 to utilize currently available processing techniques so that only a subset of the depth values from tile memory 52 are written to system memory 10.

For instance, shader core 48, via the execution of the tile-depth resolve shader, may read the depth values as a texture map with a single texture fetch to tile memory 52, rather than multiple fetches to tile memory 52. For example, the texture map may be considered as storing a plurality of depth samples, where each depth sample is associated with a pixel in the tile and the depth value of the pixel. One example instruction to fetch the depth values with a single fetch is GL_ARM_shader_framebuffer_fetch_depth_stencil, which is available in the OpenGL API. In this example, the tile-depth resolve shader may include the gl_LastFragDepthARM command to retrieve the depth values from tile memory 52. There may be other example instructions, such as in different APIs or implementation specific commands, that shader core 48, via the execution of the tile-depth resolve shader, may utilize to retrieve the depth values from tile memory 52. In this way, to write the subset of depth values (e.g., a second number of the depth values, where tile memory 52 stores a first number of the depth values), GPU 12 may read the second number of the depth values as a texture map with a single texture fetch and write the second number of the depth values based on the read depth values.

After shader core 48, via the execution of the tile-depth resolve shader, receives the depth values, shader core 48, via the execution of the tile-depth resolve shader, may output a subset of the depth values to system memory 10. For example, assume that the size of a tile is N by M, of which only $N_D$ by $M_D$ depth values need to be written from tile memory 52 to system memory 10. In this example, tile memory 52 may store N by M number of depth values (e.g., a first number of depth values equals N*M), and may write $N_D$ by $M_D$ number of depth values (e.g., a second number of depth values equals $N_D*M_D$).

As one example, tile-depth resolve shader may execute for each pixel of the tile (e.g., each depth sample in the N by M texture map), but only output depth values for a subset of the pixels. In this example, application 38 or controller 46 may define an N by M quad which defines which pixels the tile-depth resolve shader may need to read. In some examples, the tile-depth resolve shader may define the quad size of N by M. With a single texture fetch, the tile-depth resolve shader may cause shader core 48 to read depth values from tile memory 52. The tile-depth resolve shader may be configured to write to system memory 10 depth values of only $N_D$ by $M_D$ depth samples of the N by M depth samples. For example, the tile-depth resolve shader may be configured to discard depth values for (N–$N_D$) by (M–$M_D$) depth samples.

For this example, the total pixel workload is N by M because the tile-depth resolve shader executes for each of the N by M depth samples, and as part of the execution writes depth values for only $N_D$ by $M_D$ depth samples. Therefore, the total bandwidth to write the depth values is ($N_D*M_D$)*bytes_per_depth_sample. As an example, if $N_D$ equals N/10, and $M_D$ equals M/10, then in this example, there may not be any reduction in pixel workload as compared to if all depth values were written out; however, there is a 100× reduction in bandwidth.

In the above example, the tile-depth resolve shader may execute N by M times for each pixel (e.g., for each depth sample); however, the example techniques are not so limited. In some examples, rather than using one N by M sized quad to define on which pixels tile-depth resolve shader should operate, application 38 or controller 46 may define a plurality of points or small quads. For example, application 38 or controller 46 may define $N_D$ by $M_D$ small quads. For example, application 38 or controller 46 may define a plurality of quads, where each quad is the size of a pixel or a small set of pixels. In examples where a quad is the size of a pixel, the number of quads that application 38 or controller 46 define is equal to $N_D$ by $M_D$. As above, in some examples, the tile-depth resolve shader may define the $N_D$ by $M_D$ sized quads.

In examples where the size of the quad is a single pixel, the tile-depth resolve shader may execute only $N_D$ by $M_D$ times (e.g., once for each of the $N_D$ by $M_D$ number of depth samples). In this way, depth values other than the depth values for the $N_D$ by $M_D$ depth samples are implicitly not retained. For example, the tile-depth resolve shader may execute only on the depth samples that correspond to the $N_D$ by $M_D$ depth samples, and store their depth values in system memory 10. In this example, the total pixel workload may be $N_D$ by $M_D$, rather than N by M. The total bandwidth may be $N_D*M_D$*bytes_per_depth_sample. As an example, if $N_D$ equals N/10, and $M_D$ equals M/10, then in this example, there may be a reduction of 100× in pixel workload as compared to if all depth values were written out. There may also be a 100× reduction in bandwidth.

In the above examples, the tile-depth resolve shader is described as outputting the $N_D$ by $M_D$ depth values to system memory 10. However, in some examples, the tile-depth resolve shader may perform additional operations on the depth values prior to writing to system memory 10. As one example, the tile-depth resolve shader may read in A by B depth values of the N by M depth values, and average the A by B depth values or determine the largest of the A by B depth values to generate the $N_D$ by $M_D$ depth values. Averaging A by B depth values, or determining largest of the A by B depth values are example filtering techniques. The tile-depth resolve shader may perform filtering techniques other than averaging or determining largest value or a combination of filtering techniques. The tile-depth resolve shader may then output the $N_D$ by $M_D$ depth values.

There may be various ways in which GPU 12 executes the tile-depth resolve shader. As one example, the developer may include a plurality of drawcalls in application 38 that are used to render image content for a framebuffer object (FBO) of OpenGL or frame targets model of DirectX. After the drawcalls for a given FBO or frame targets model, the developer may include a depth values drawcall that uses the tile-depth resolve shader.

In some examples, the tile-depth resolve shader is to read the depth values, and not necessarily write depth values to tile memory 52 but to system memory 10. Accordingly, in some examples, the drawcall used to call the execution of the tile-depth resolve shader may disable writing depth values to tile memory 52. Also, testing the depth values to determine occlusion of pixels may not be necessary, and therefore, the drawcall may disable the depth test.

In some examples, rather than the developer including the depth values drawcall, a compiler that complies application 38 may include the depth values drawcall. As another example, GPU driver 42 may include the depth values drawcall in application 38. Other ways in which to include the depth values drawcall in application 38 may be possible.

There may also be various ways in which to determine the $N_D$ by $M_D$ depth values of the N by M depth values that are written to system memory 10. As one example, the tile-depth resolve shader may be configured to retrieve every $X^{th}$ depth value stored horizontally in tile memory 52, and every $Y^{th}$ depth value stored vertically in tile memory 52. In this example, $N_D$ equals N/X, and $M_D$ equals M/Y.

As another example, the developer may define which depth values to read. As another example, application 38 may be configured to define which depth values to read.

The tile-depth resolve shader may write the depth values from tile memory 52 to system memory 10 with unordered access view (UAV). UAV may allow read/write access to system memory 10 to multiple threads (e.g., instances of an instruction of tile-depth resolve shader) without generating memory conflicts. For instance, because GPU 12 provides multi-threading and high level of parallel processing, multiple instances of tile-depth resolve shader may execute in parallel, where each instance of the tile-depth resolve shader is operating on depth values of different pixels.

Due to the parallel execution of different instances of the tile-depth resolve shader, two or more instances of the tile-depth resolve shader may need to access system memory 10 at overlapping times. A UAV allows for the two or more instances of the tile-depth resolve shader to access system memory 10 without causing memory conflicts.

Although UAV may allow for memory access without memory conflicts, there may be loss of information about which depth value is associated with which pixel when storing in system memory 10. Accordingly, controller 46 may track which depth values are associated with which pixels of the tile to determine where in the UAV to write to based on the pixel for which the tile-depth value shader is executing.

For example, as described above, the depth values may be used for the warping image content as part of the warping round. Therefore, controller 46 may need to determine with which portion of the image frame a particular depth value is associated. For instance, if 1% of the depth values are to be retained (e.g., depth values for 1% of the depth samples), controller 46 may need to track the position in the image frame with which each of the depth values for the 1% of depth samples is associated. As an illustration, assume that the size of the image frame is 1000×1000 pixels. In this example, GPU 12 may retain depth values for 10,000 of the 1000×1000 pixels. Accordingly, the first depth value may be associated with pixel (10, 10), the second depth value may be associated with pixel (20, 10), and the $100^{th}$ depth value may be associated with pixel (1000, 10), and then the $101^{st}$ depth value may be associated with pixel (10, 20), the $102^{nd}$ depth value may be associated with pixel (20, 20), and so forth.

In this example, controller 46 may store information that indicates that the first depth value is for pixel (10, 10), the second depth value is for pixel (20, 10), and so forth. One example way to do that is by storing the depth value for pixel (10, 10) at a location (10, 10) in system memory 10, storing the depth value for pixel (20, 10) at a location (20, 10) in system memory 10, and so forth. Other example ways to associate depth values with particular pixels may be possible.

Then, during the warping round, controller 46 may utilize the information indicating with which pixel a depth value is associated. For example, to determine depth in a location around 800×700, controller 46 may utilize the depth values at the 80×70 depth sample in the $N_D \times M_D$ space available in system memory 10 for storing the depth values.

In one or more examples, the tile-depth value shader may be configured to perform the operations of resolving the depth values from tile memory 52 to system memory 10. For example, the tile-depth value shader may write a subset of the depth values from tile memory 52 to system memory 10. Accordingly, there may not be a need to resolve the entirety of the depth values from tile memory 52 to system memory 10.

For example, by default, in OpenGL, the full set of depth values are always retained at the end of rendering an FBO (e.g., there is full resolve of depth values). The developer, a compiler, or GPU driver 42 may include instructions to invalidate or discard the depth values so that GPU 12 does not need to store them in system memory 10. Because the tile-depth resolve shader already retained the depth values that are needed, the depth values may be invalidated or discarded. As an example, the developer may include the glInvalidateFramebuffer( )/glDiscardFramebufferEXT( ) on GL_DEPTH_ATTACHMENT instructions to invalidate or discard the depth values.

FIG. 2 illustrates one or more examples in which, during a binning pass, controller 46, shader core 48, and fixed-function units 50 may determine which primitives belong to which tiles of a plurality of tiles of a frame. Then, during a rendering pass, shader core 48 and fixed-function units 50 may generate depth values for one or more pixels of the tile that were determined during the binning pass to belong to the tile for which the depth values are being generated. For example, shader core 48 and fixed-function units 50 may determine pixel values for pixels in a tile-by-tile basis, and perform such determinations during the rendering pass for a particular tile.

Shader core 48 and/or fixed-function units 50 may store the depth values for the pixels in tile memory 52 that is internal to GPU 12. As described, tile memory 52 may be configured to store image content for the tile of the frame. As one example, a pixel (or fragment shader) executing on shader core 48 may output the depth values for the pixels in the tile to tile memory 52, but other components, include one or more of fixed-function units 50 may output the depth values for the pixels in the tile to tile memory 52.

The example operations to generate and store the depth values for pixels in tile memory 52 may be performed based on the drawcalls included in application 38, which shader core 48 and fixed-function units 50 execute. In some examples, application 38 may include a depth values draw-call after the drawcalls used to render at least part of the image content for the tile (e.g., after a plurality of drawcalls in application 38 that are used to render image content for a framebuffer object (FBO) of OpenGL or frame targets model of DirectX).

Shader core 48 may execute a tile-depth resolve shader, as part of the depth values drawcall, to write a subset of the depth values stored in tile memory 52 to system memory 10 (e.g., the actual depth values for a subset of the depth values or compressed depth values that are compressed from the actual depth values of a subset of the depth values). As one example, shader core 48, via execution of the tile-depth resolve shader, may read the depth values as a texture map from tile memory 52 with a single texture fetch to tile memory 52. In some examples, shader core 48, via execution of the tile-depth resolve shader, may read all of the depth values for a tile from tile memory 52, and selectively write the subset of the depth values to system memory 10. In some examples, shader core 48, via execution of the tile-depth resolve shader, may read a subset of the depth values for a tile from tile memory 52, and write the subset of the depth values to system memory 10. In this way, GPU 12 only writes the subset of depth values to system memory 10 from the depth values stored in the tile memory.

GPU 12 may repeat such operations on a tile-by-tile basis. For example, shader core 48 and/or fixed-function units 50 may store rendered image content for each of the plurality of tiles in sequential rendering passes of each of the tiles. Shader core 48 may execute the tile-depth resolve shader in each sequential rendering pass of each of the tiles to sequentially write respective subsets of the depth values (e.g., depth values for each of the tiles) stored in tile memory 52 to system memory 10.

The reduction in bandwidth and reduction in amount of depth values that are stored may be beneficial for bandwidth usage and memory storage usage. Some techniques may write all depth values to system memory 10 from tile memory 52. Then to reduce the amount of memory storage being used, these other techniques may sample the depth values as a texture map, render $N_D$ by $M_D$ pixels via a computer shader, and resolve $N_D$ by $M_D$ pixels to system memory 10. While such techniques may reduce the amount of storage space used in system memory 10, the total bandwidth may be equal to $N*M + 2*N_D*M_D*$bytes_per_pixel+cache inefficiency (e.g., due to partial reads, and dependent upon amount of downsampling). Hence, while these techniques may reduce the amount of storage space used in system memory 10, the bandwidth may be much greater than the example techniques that use $N_D*M_D*bytes\_per\_pixel$ (or bytes_per_depth sample).

In some techniques where the total bandwidth is defined as $N*M+2*N_D*M-_D*bytes\_per\_pixel+cache$ inefficiency, the total bandwidth may be based on all of the depth values because all depth values are read back (e.g. $N*M$). Also, the reading of the depth values that are retained is $N_D*M_D*bytes\_per\_pixel$. However, in this case, there is also the writing back of the depth values, and therefore, the total bandwidth also includes both $N*M$ and $2*N_D*M_D*bytes\_per\_pixel$ (e.g., $N*M+2*N_D*M-_D*bytes\_per\_pixel$). Moreover, there is cache inefficiency because, as noted above, there are partial reads and dependency upon downsampling. Therefore, the total bandwidth in some other techniques is $N*M+2*N_D*M_D*bytes\_per\_pixel+cache$ inefficiency.

Figure 3A:
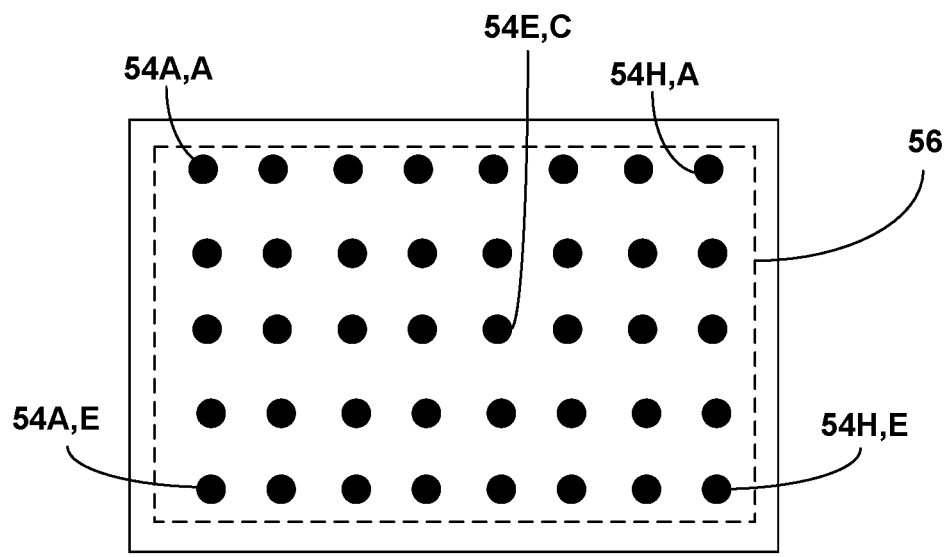
FIGS. 3A and 3B are conceptual diagrams illustrating pixels evaluated for storage of depth values.
Figure 3B:
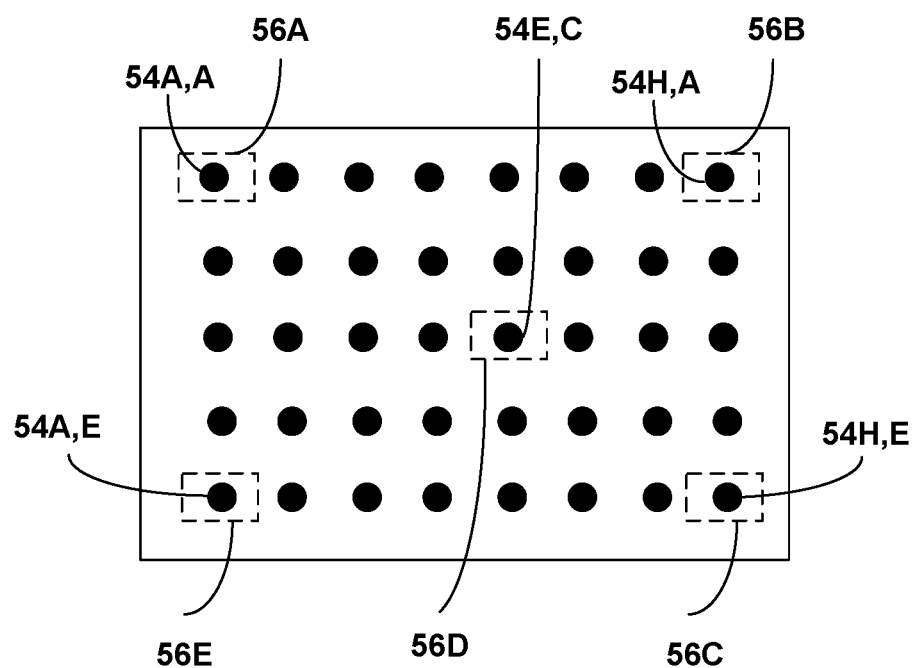

FIGS. 3A and 3B are conceptual diagrams illustrating pixels evaluated for storage of depth values. FIGS. 3A and 3B illustrate an example of a tile with size H by E. For instance, the tile includes pixels 54A,A to 54H,E.

In the example of FIG. 3A, the tile-depth resolve shader, shader core 48, may execute one instance of the tile-depth resolve shader for each one of pixels 54A,A to 54H,E. For instance, the tile-depth resolve shader may receive as input a value of H by E that defines a space from which tile-depth resolve shader reads depth values from tile memory 52 as a texture map.

Controller 46 and/or application 38 may define a quad 56, and provide information (e.g., size) of quad 56 to the tile-depth resolve shader. The tile-depth resolve shader may then fetch in a single texture map fetch the depth values from tile memory 52, as defined by quad 56, and execute on each of the depth values. The tile-depth resolve shader may be configured to discard all depth values except a select few identified depth values. For example, the tile-depth resolve shader may be configured to discard all depth values except those for pixels 54A,A, 54H,A, 54E,C, 54A,E, and 54H,E. The tile-depth resolve shader may store the depth values for pixels 54A,A, 54H,A, 54E,C, 54A,E, and 54H,E in system memory 10.

In the example illustrated in FIG. 3B, rather than executing the tile-depth resolve shader for each pixel, shader core 48 may execute an instance of the tile-depth resolve shader for a select number of pixels. For example, controller 46 and/or application 38 may define a plurality of quads 56A-56E (collectively quads 56) that each encompass one pixel in the tile. Controller 46 and/or application 38 may define quads 56 based on the depth values that are to be retained. In this example, there are five quads 56. Accordingly, shader core 48 may execute five instances of the tile-depth resolve shader, rather than one instance for each of the pixels 54A,A to 54H,E. Shader core 48 may store the depth values for pixels 54A,A, 54H,A, 54E,C, 54A,E, and 54H,E in system memory 10.

Figure 4:
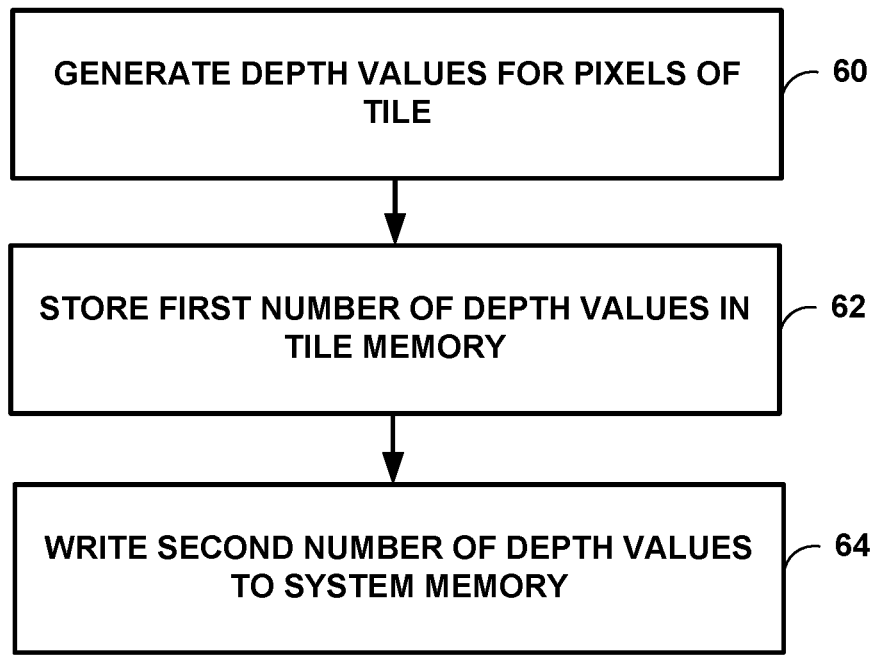
FIG. 4 is a flowchart illustrating an example method of storing depth values.

FIG. 4 is a flowchart illustrating an example method of storing depth values. As one example, GPU 12 may generate depth values for pixels of a tile, where the tile is one of a plurality of tiles of a frame (60). For example, during a binning pass, GPU 12 may determine which primitives belong to which tiles of the plurality of tiles. During a rendering pass, GPU 12 may generate the depth values for pixels of the primitives of the tile that were determined during the binning pass to belong to the tile for which the depth values are being generated.

GPU 12 may store a first number of the depth values for the pixels in tile memory 52 that is internal to GPU 12 (62). Tile memory 52 may be configured to store image content for the tile of the frame. For example, shader core 48 and/or fixed-function units 50 may form a graphics pipeline, and the output of the operations of the graphics pipeline may be pixel values such as color, opacity, and depth values. Shader core 48 and/or fixed-function units 50 of GPU 12 may store the pixel values, including the depth values for the tile being rendered to tile memory 52 that is internal to GPU 12 (e.g., does not need bus 20 of FIG. 1 to access tile memory 52).

GPU 12 may write a second number of the depth values stored in tile memory 52 to system memory 10 (64). The second number is less than the first number. As one example, to write the second number of depth values, GPU 12 may execute a shader (e.g., tile-depth resolve shader) on GPU 12 to write the second number of the depth values stored in tile memory 52 to system memory 10 (64). GPU 12 may write the second number of depth values in response to a drawcall included after drawcalls used to render at least a part of the image content for the tile. As one example, shader core 48 may execute the tile-depth resolve shader in response to a drawcall (e.g., depth values drawcall) included after drawcalls used to render at least a part of the image content for the tile.

In some examples, GPU 12 may read the second number of the depth values as a texture map with a single texture fetch, and write the second number of the depth values based on the read depth values. For example, in executing the tile-depth resolve shader, shader core 48 may read the depth values as a texture map with a single texture fetch to tile memory 52. In this way, GPU 12 may only write the subset of depth values (e.g., a second number of depth values) to system memory 10 from the depth values (e.g., a first number of depth values stored in tile memory 52.

As described above, the example techniques may be applicable for warping image content. For example, as part of the warping, GPU 12 may read the color and opacity values for the pixels of the tile from system memory 10 that were stored during the eye-buffer round. Also, GPU 12 may read the subset of the depth values of the tile (e.g., the second number of depth values) that were stored during the eye-buffer round in accordance with the example techniques described in this disclosure. GPU 12 may then warp image content of the tile based on the read depth values and the read color and opacity values for the pixels of the tile. Example warping techniques include timewarp, where head position is used to texture map image content (e.g., the color values of the pixels of the tile).

Moreover, in some examples, while GPU 12 may store a subset of the depth values for the pixels, GPU 12 may store color or opacity values for more of the pixels. For example, if tile memory 52 stores a first number of depth values for the pixels of the tile, tile memory 52 may store a third number of color or opacity values for the pixels. The third number may be the same as the first number, but the techniques are not so limited. GPU 12 may write the third number of color or opacity values for the pixels of the tile, where the third number is greater than the second number. For instance, GPU 12 may use memory resolve commands to resolve the color or opacity values from tile memory 52 to system memory 10. However, these memory resolve commands may not include commands to resolve the depth values since GPU 12 may have written out the second number of depth values (e.g., by execution of the tile-depth resolve shader).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of generating image content, the method comprising:
   generating, with a graphics processing unit (GPU), depth values for pixels of a tile of a frame;
   storing a first number of the depth values for the pixels in a tile memory internal to the GPU, wherein the tile memory is configured to store image content for the tile of the frame; and
   writing a second number of the depth values stored in the tile memory to a system memory, wherein the second number is less than the first number and the second number of the depth values is a subset of the first number of the depth values.

2. The method of claim 1, wherein writing the second number of the depth values comprises executing a shader on the GPU to write the second number of the depth values stored in the tile memory to the system memory.

3. The method of claim 1, wherein writing the second number of the depth values comprises writing the second number of the depth values in response to a drawcall included after drawcalls used to render at least a part of the image content for the tile.

4. The method of claim 1, further comprising:
   reading the second number of the depth values as a texture map with a single texture fetch to the tile memory,
   wherein writing the second number of the depth values comprises writing the second number of the depth values based on the read depth values.

5. The method of claim 1, further comprising:
   generating color or opacity values for the pixels of the tile;
   storing a third number of the color or opacity values for the pixels of the tile, wherein the third number is greater than the second number; and
   writing the third number of the color or opacity values for the pixels of the tile.

6. The method of claim 1, wherein the tile is one of a plurality of tiles of the frame, the method further comprising:
   during a binning pass, determining which primitives belong to which tiles of the plurality of tiles,
   wherein generating the depth values comprises generating the depth values, during a rendering pass, for pixels of the primitives of the tile that were determined during the binning pass to belong to the tile for which the depth values are being generated.

7. The method of claim 1, further comprising:
   reading color and opacity values for the pixels of the tile;
   reading the second number of the depth values of the tile; and
   warping the image content of the tile based on the read depth values and the read color and opacity values for the pixels of the tile.

8. A device for generating image content, the device comprising:
   a system memory; and
   a graphics processing unit (GPU) including a tile memory, the GPU configured to:
   generate depth values for pixels of a tile of a frame;
   store a first number of the depth values for the pixels in the tile memory, wherein the tile memory is configured to store image content for the tile of the frame; and
   write a second number of depth values stored in the tile memory to the system memory, wherein the second number is less than the first number and the second number of the depth values is a subset of the first number of the depth values.

9. The device of claim 8, wherein to write the second number of the depth values, the GPU is configured to execute a shader to write the second number of the depth values stored in the tile memory to the system memory.

10. The device of claim 8, wherein to write the second number of depth values, the GPU is configured to write the second number of depth values in response to a drawcall included after drawcalls used to render at least a part of the image content for the tile.

11. The device of claim 8, wherein the GPU is configured to:
    read the second number of depth values as a texture map with a single texture fetch to the tile memory,
    wherein to write the second number of depth values comprises writing the second number of depth values based on the read depth values.

12. The device of claim 8, wherein the GPU is configured to:
    generate color or opacity values for the pixels of the tile;

store a third number of the color or opacity values for the pixels of the tile, wherein the third number is greater than the second number; and write the third number of the color or opacity values for the pixels of the tile.

13. The device of claim 8, wherein the tile is one of a plurality of tiles of the frame, wherein the GPU is configured to:
during a binning pass, determine which primitives belong to which tiles of the plurality of tiles,
wherein to generate the depth values, the GPU is configured to generate the depth values, during a rendering pass, for pixels of the primitives of the tile that were determined during the binning pass to belong to the tile for which the depth values are being generated.

14. The device of claim 8, wherein the GPU is configured to:
read color and opacity values for the pixels of the tile;
read the second number of depth values of the tile; and
warp the image content of the tile based on the read depth values and the read color and opacity values for the pixels of the tile.

15. A non-transitory computer-readable storage medium storing instructions that when executed cause a graphics processing unit (GPU) to:
generate depth values for pixels of a tile of a frame;
store a first number of the depth values for the pixels in a tile memory internal to the GPU, wherein the tile memory is configured to store image content for the tile of the frame; and
write a second number of the depth values stored in the tile memory to a system memory, wherein the second number is less than the first number and the second number of the depth values is a subset of the first number of the depth values.

16. The non-transitory computer-readable storage medium of claim 15, wherein the instructions that cause the GPU to write the second number of the depth values comprise instructions that cause the GPU to execute a shader to write the second number of the depth values stored in the tile memory to the system memory.

17. The non-transitory computer-readable storage medium of claim 15, wherein the instructions that cause the GPU to write the second number of the depth values comprises instructions that cause the GPU to write the second number of the depth values in response to a drawcall included after drawcalls used to render at least a part of the image content for the tile.

18. The non-transitory computer-readable storage medium of claim 15, further comprising instructions that cause the GPU to:
read the second number of the depth values as a texture map with a single texture fetch to the tile memory, and
wherein the instructions that cause the one or more GPU to write the second number of the depth values comprise instructions that cause the GPU to write the second number of the depth values based on the read depth values.

19. The non-transitory computer-readable storage medium of claim 15, further comprising instructions that cause the GPU to:
generate color or opacity values for the pixels of the tile;
store a third number of the color or opacity values for the pixels of the tile, wherein the third number is greater than the second number; and
write the third number of the color or opacity values for the pixels of the tile.

20. The non-transitory computer-readable storage medium of claim 15, wherein the tile is one of a plurality of tiles of the frame, the storage medium further comprising instructions that cause the GPU to:
during a binning pass, determine which primitives belong to which tiles of the plurality of tiles,
wherein the instructions that cause the GPU to generate the depth values comprise instructions that cause the GPU to generate the depth values, during a rendering pass, for pixels of the primitives of the tile that were determined during the binning pass to belong to the tile for which the depth values are being generated.

21. The non-transitory computer-readable storage medium of claim 15, further comprising instructions that cause the GPU to:
read color and opacity values for the pixels of the tile;
read the second number of the depth values of the tile; and
warp the image content of the tile based on the read depth values and the read color and opacity values for the pixels of the tile.

22. A device for generating image content, the device comprising:
means for generating depth values for pixels of a tile of a frame;
means for storing a first number of the depth values for the pixels in a tile memory of a graphics processing unit (GPU), wherein the tile memory is configured to store image content for the tile of the frame; and
means for writing a second number of the depth values stored in the tile memory to a system memory, wherein the second number is less than the first number and the second number of the depth values is a subset of the first number of the depth values.

23. The device of claim 22, wherein the means for writing the second number of the depth values comprises means for executing a shader on the GPU to write the second number of the depth values stored in the tile memory to the system memory.

24. The device of claim 22, wherein the means for writing the second number of the depth values comprises means for writing the second number of the depth values in response to a drawcall included after drawcalls used to render at least a part of the image content for the tile.

25. The device of claim 22, further comprising:
means for reading the second number of the depth values as a texture map with a single texture fetch to the tile memory,
wherein the means for writing the second number of the depth values comprises means for writing the second number of the depth values based on the read depth values.

26. The device of claim 22, further comprising:
means for generating color or opacity values for the pixels of the tile;
means for storing a third number of the color or opacity values for the pixels of the tile, wherein the third number is greater than the second number; and
means for writing the third number of the color or opacity values for the pixels of the tile.

27. The device of claim 22, wherein the tile is one of a plurality of tiles of the frame, the device further comprising:
means for determining, during a binning pass, which primitives belong to which tiles of the plurality of tiles,
wherein the means for generating the depth values comprises means for generating the depth values, during a rendering pass, for pixels of the primitives of the tile that were determined during the binning pass to belong to the tile for which the depth values are being generated.

28. The device of claim 22, further comprising:

means for reading color and opacity values for the pixels of the tile;

means for reading the second number of the depth values of the tile; and means for warping the image content of the tile based on the read depth values and the read color and opacity values for the pixels of the tile.

\* \* \* \* \*